Nov. 9, 1926.  1,606,703
H. C. HOUSER
MITER BOX AND HANDSAW GUIDE
Filed April 14, 1926    2 Sheets-Sheet 1
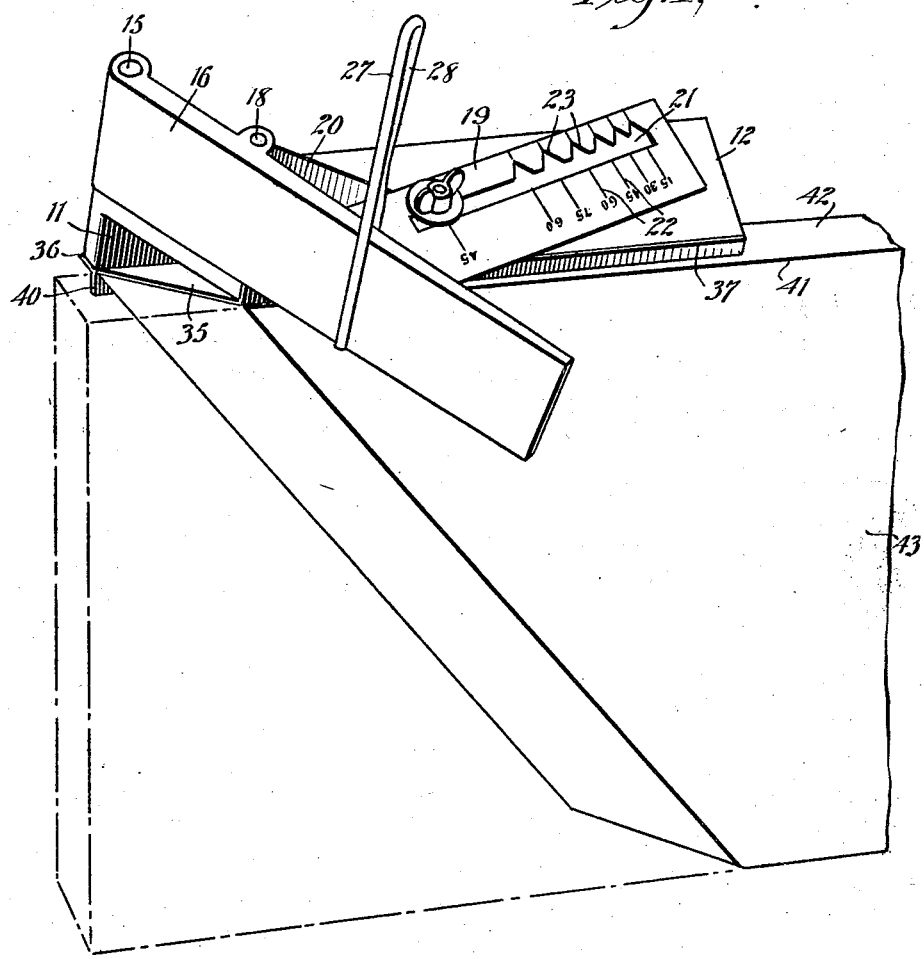
Fig.1,
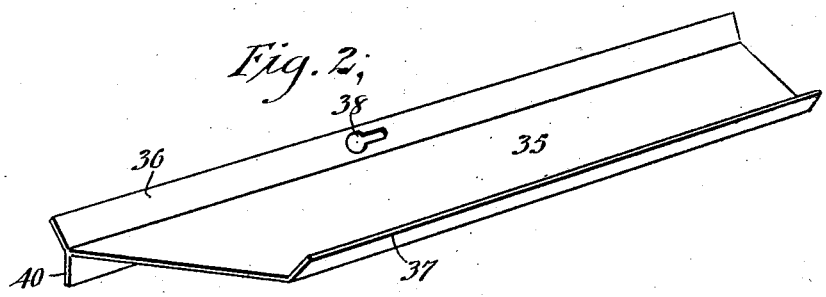
Fig.2,
WITNESSES
INVENTOR
H. C. Houser
BY
ATTORNEYS Nov. 9, 1926.  1,606,703
H. C. HOUSER
MITER BOX AND HANDSAW GUIDE
Filed April 14, 1926  2 Sheets-Sheet 2
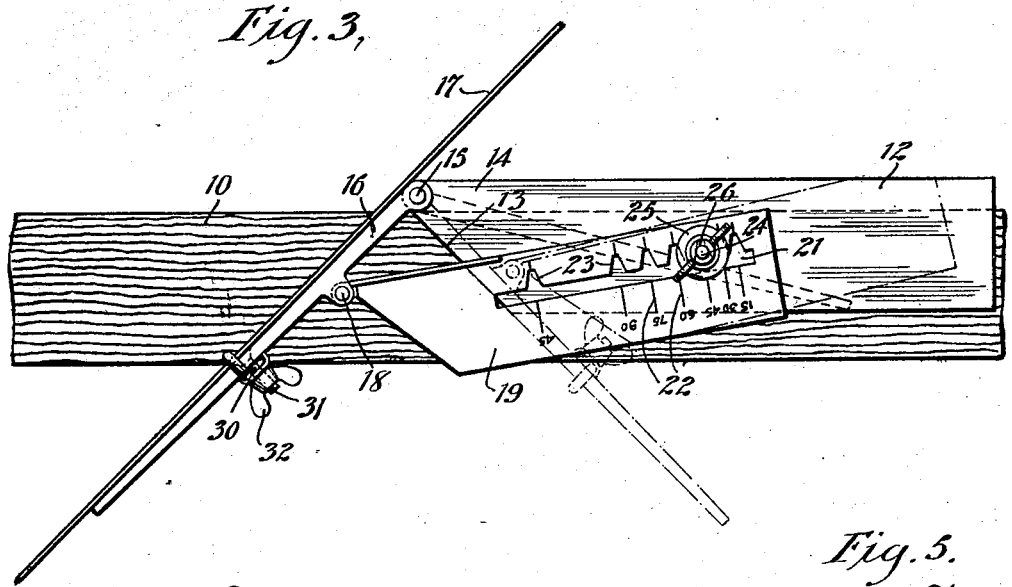
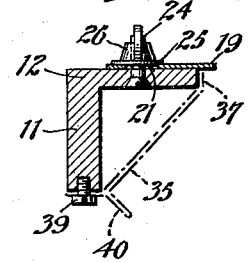
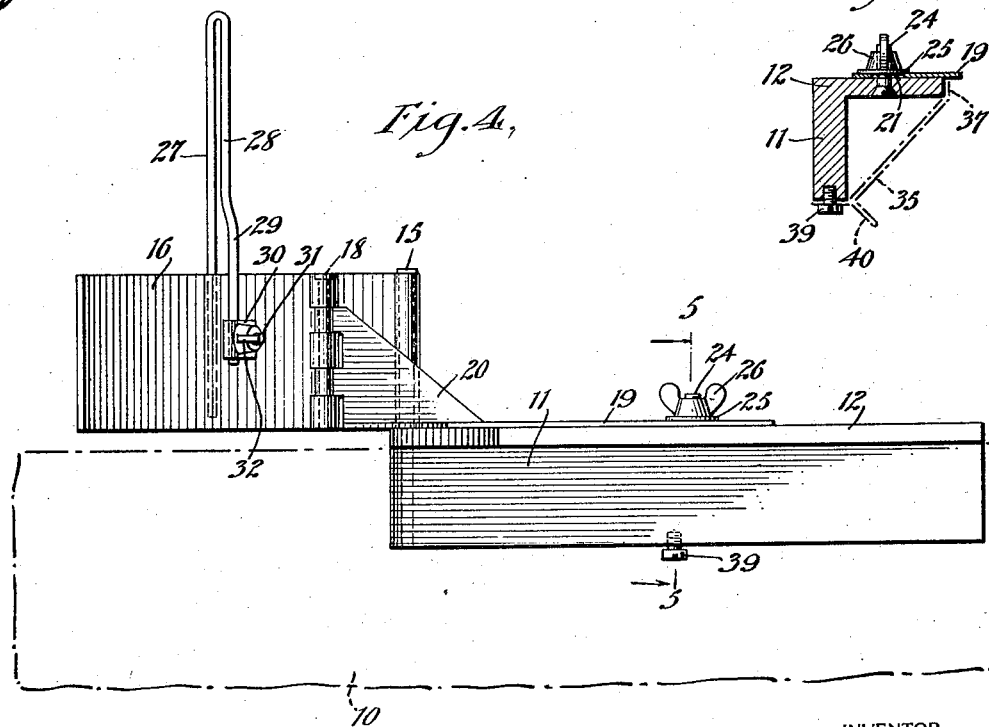
WITNESSES
INVENTOR
H. C. Houser
BY
ATTORNEYS Patented Nov. 9, 1926.

1,606,703

UNITED STATES PATENT OFFICE.

HERBERT C. HOUSER, OF ST. LOUIS, MISSOURI.

MITER BOX AND HANDSAW GUIDE.

Application filed April 14, 1926. Serial No. 102,040.

The present invention is concerned with the provision of a carpenter's tool adapted to serve as a gauge and guide for a saw when cutting miter joints, hip rafter angles, or making any other simple or compound angular cut in a piece of lumber.

The tool is further suited for laying out angles so that they may be cut in the usual way.

An object of the invention is to provide a device of this character so constructed that the difficult hip rafter angles may be expeditiously cut without the necessity for laboriously laying them out and making two saw cuts in the usual manner. The tool of the present invention when used as a hip rafter cutting guide, permits the end of a hip rafter to be properly finished by a single saw cut, and permits this angle to be gauged by the movement of a single gauge plate which regulates the cutting of both angles.

A further object of the invention is to provide a tool which will eliminate the necessity of using the ordinary complicated and cumbersome miter box.

Other objects of the invention are to provide a tool of simple, practical construction which will be durable and efficient in use, which may be readily manipulated by an unskilled mechanic, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a perspective view illustrating the manner of using the tool to cut a hip rafter angle, the body of the hip rafter being shown in full lines, and the portion which is cut away and forming the angle being indicated in dot and dash lines.

Fig. 2 is a perspective view of the hip rafter cutting plate.

Fig. 3 is a top plan view of the tool with the plate of Fig. 2 removed, showing the same in position for guiding and gauging a saw when cutting miter joints or other simple angles.

Fig. 4 is a view in side elevation of Fig. 3.

Fig. 5 is a transverse sectional view on the line 5—5 of Fig. 4 indicating in dotted lines the position of the hip rafter cutting plate when applied.

In the following specification I shall first point out the construction and operation of the tool as used for simple angle cutting operations such as are necessary in the formation of miter joints or the like. The tool in its simplest form has been illustrated in Figs. 3 and 4, wherein the reference character 10 designates a timber to be cut. The tool includes a pair of relatively heavy metallic timber embracing plates 11 and 12 disposed at right angles to each other, and integrally connected at one edge. Plate 12 constitutes a base plate adapted to rest upon the upper surface of the timber 10, and plate 11 constitutes a flange adapted to abut the side surface thereof. One end face of the plate 12 is bevelled or cut away as indicated at 13 so that it is disposed at a 45° angle relative to the longitudinal axes of the plate, and so that the plate proper is formed with an angular forward extension 14, the corner of which carries a hinge pin 15 upon which is pivotally mounted one end of a wing plate 16 which serves as an abutment to guide the movement of an ordinary hand saw 17.

Near its pivoted end the wing plate 16 mounts a hinge pin 18. A gauge plate 19 slidable over the face of the plate 12 is formed at one edge with an upstanding approximately triangular ear 20 pivotally connected to the hinge pin 18.

The gauge plate 19 is formed with a longitudinal slot 21 therein graduated on one side by scale marks 22 representing angles and formed in its other edge with notches 23 which register with the scale marks. A stud member 24 rising from the face of the plate 12 is adapted to enter any of the notches 23. This stud member is encircled by a washer 25 which may be clamped against the gauge plate 19 by a wing nut 26. When the tool is placed on a piece of timber as indicated in Fig. 3, and the stud locked in any of the notches 23, the wing plate 16 will be disposed at an angle to the longitudinal axis of the timber corresponding to the angle designated by the scale mark opposite the particular notch in which the stud is set. Thus, in Fig 3 the stud 24 is set in the 45° notch of the gauge plate, and the wing plate 16 is disposed at a 45° angle relative to the longitudinal axis of the timber 10.

It will be evident that the wing plate 16 may be used as a pencil guide for laying out any desired angles upon a board. I prefer however, to associate a saw guide with the wing plate so that the gauge plate may be set to the proper angle and the timber immediately sawed by abutting the saw 17 against the wing plate.

The saw guide which I have illustrated consists of a length of wire bent upon itself to define a pair of substantially parallel fingers 27 and 28. The finger 27 lies against the face of the wing plate 16, and is adapted to retain the saw 17 when the latter is inserted between the plate and the finger, in parallelism with the plate. Finger 28 is slightly offset at 29, and the offset end of this finger is received under a clamping element 30 held in place on a stud 31 by a wing nut 32. The saw guide may be readily removed by simply loosening the wing nut and pulling the end 29 of the finger 28 out from under the clamping member 30.

I have described the manner of the use of the device for cutting ordinary simple angles of any kind, in any type of work, such for instance as picture frames, window stops, casing, baseboards, etc. The tool however, is provided with an attachment which makes it suitable for cutting compound hip rafter angles by a single cut, and the manner in which the tool is used for this purpose is illustrated in Fig. 1.

To adapt the tool for hip rafter work, I employ an attachment in the nature of a hip rafter plate shown in Fig. 2. This plate may be formed of thin sheet metal stock including a main body portion 35, and a pair of flanges 36, 37 at opposite edges of the body portion which are disposed at approximately a 45° angle relative thereto. These flanges are adapted to lie against the narrow edge faces of the plates 11 and 12 respectively. Preferably the flange 36 is formed with a keyhole slot 38 for coaction with a headed stud or set screw 39 projecting from the narrow edge face of the plate 11. Integral with the flange 36 is a flange 40 adapted to lie against the side face of a hip rafter 41 to be cut. In using the tool for cutting hip rafter angles, the plate 35 is attached and laid flat against the narrow face 42 of the hip rafter. The tool is then shifted laterally until the flange 40 abuts against the wide face of the hip rafter.

With the tool in the position of Fig. 1, it will be noted that both the plates 11 and the plate 12 are disposed at a 45° angle relatively to the narrow upper surface 42 of the hip rafter 41, and at a similar angle relative to the wide face 43 of the hip rafter. If we assume that the gauge plate is set at 45°, it will be noted that the wing plate 16 will be disposed at an angle to properly guide the saw 17 in making a compound angular cut through the rafter. In Fig. 1 this compound angular cut has been illustrated, and it will be noted that the plane of the cut is at an angle to the transverse plane of the rafter, and at an angle to both longitudinal planes of the rafter. In other words, the lines on which the saw intersects the surfaces 42 and 43 of the hip rafter are angularly disposed relative to all of the edges of the rafter. The saw in cutting is disposed at a 45° angle relative to the transverse axes of the upper surface 42 of the rafter and cuts through the rafter on a 45° angle relative to the transverse axes of the wide surface 43.

It will be evident that by shifting the position of the plate 16 other compound angles may be obtained for hip rafter purposes, and that the necessity for laying out hip angles in the manner heretofore customary will be entirely eliminated. The common practice is to make two cuts. The first cut changing the relative lengths of the two narrow surfaces of the rafter, while leaving the wide surfaces thereof of the same length, and the second cut changing the relative lengths of the wide surfaces of the rafter without effecting the previously determined relation of the narrow surfaces thereof. By the use of the tool of the present invention I simultaneously vary the relative lengths of both the wide surfaces and narrow surfaces and form the compound angle by a single cut.

Obviously, various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A tool of the class described including a base plate, a depending flange at one edge of the base plate, a saw guiding wing plate pivoted to one corner of the base plate, a gauge plate regulating the relative adjustment of the wing plate and base plate, and means for supporting the base plate in tilted position relatively to the surface of the work, whereby the wing plate may serve as a guide for cutting compound angles.

2. A tool of the class described including a base plate, a depending flange at one edge of the base plate, a saw guiding wing plate pivoted to one corner of the base plate, a gauge plate regulating the relative adjustment of the wing plate and base plate, and means for supporting the base plate in tilted position relatively to the surface of the work, whereby the wing plate may serve as a guide for cutting compound angles, said means including a plate detachably connected to the base plate flange and extending from the edge of the flange to the opposite edge of the base plate.

3. A tool of the class described including a base plate, a depending flange at one edge of the base plate, a saw guiding wing plate pivoted to one corner of the base plate, a gauge plate regulating the relative adjustment of the wing plate and base plate, and means for supporting the base plate in tilted position relatively to the surface of the work, whereby the wing plate may serve as a guide for cutting compound angles, said means including a plate detachably connected to the base plate flange and extending from the edge of the flange to the opposite edge of the base plate, said detachable plate including 45° angular flanges lying against the edge faces of the base plate and base plate flange.

4. A tool of the class described including a base plate, a depending flange at one edge of the base plate, a saw guiding wing plate pivoted to one corner of the base plate, a gauge plate regulating the relative adjustment of the wing plate and base plate, and means for supporting the base plate in tilted position relatively to the surface of the work, whereby the wing plate may serve as a guide for cutting compound angles, said means including a plate detachably connected to the base plate flange and extending from the edge of the flange to the opposite edge of the base plate, said detachable plate including 45° angular flanges lying against the edge faces of the base plate and base plate flange, one of said flanges having a keyhole slot therein coacting with a headed stud projecting from the base plate flange.

HERBERT C. HOUSER.